United States Patent [19]

Swanson et al.

[11] 4,346,763
[45] Aug. 31, 1982

[54] AGRICULTURAL IMPLEMENT SECTIONAL FRAME WITH DEPTH LIMIT

[75] Inventors: William C. Swanson, Clarendon Hills; Evert J. Heersink, Hinsdale, both of Ill.

[73] Assignee: International Harvester Co., Chicago, Ill.

[21] Appl. No.: 210,985

[22] Filed: Nov. 28, 1980

[51] Int. Cl.³ .............................................. A01B 63/111
[52] U.S. Cl. .......................................... 172/2; 60/484; 91/410; 172/310; 172/401; 280/43.23
[58] Field of Search .......... 172/2, 4, 310, 311, 172/400, 401, 411, 413; 280/43.13, 43.23; 91/410, 445, 514, 515, 517, 518; 60/384, 420, 426, 484

[56] References Cited

U.S. PATENT DOCUMENTS

| | | | |
|---|---|---|---|
| 3,481,489 | 12/1969 | Stauffer | 91/515 X |
| 3,486,761 | 12/1969 | Fay | 280/43.23 |
| 3,606,051 | 9/1971 | Peterson et al. | 60/484 X |
| 3,731,748 | 5/1973 | Sullivan et al. | 172/413 X |
| 3,731,749 | 5/1973 | Sullivan et al. | 172/401 |
| 4,207,951 | 6/1980 | Wilcox et al. | 172/225 |
| 4,237,688 | 12/1980 | Demmers | 60/484 |
| 4,261,275 | 4/1981 | Demmers | 60/420 X |

FOREIGN PATENT DOCUMENTS 699238 11/1979 U.S.S.R. .............................. 91/420

*Primary Examiner*—Richard T. Stouffer
*Attorney, Agent, or Firm*—J. W. Gaines; F. D. AuBuchon

[57] ABSTRACT

A multi-segment farm implement flexible tool bar or frame is provided with a hydraulic system including a rotary flow divider for raising and lowering each segment of the sectional frame in synchronous movement with the other sections. A mechanical linkage associated with a ground wheel positioning cylinder also activates the hydraulic fluid control system limiting the downward movement of the implement mounted to the sectional frame on its supporting gear.

8 Claims, 3 Drawing Figures

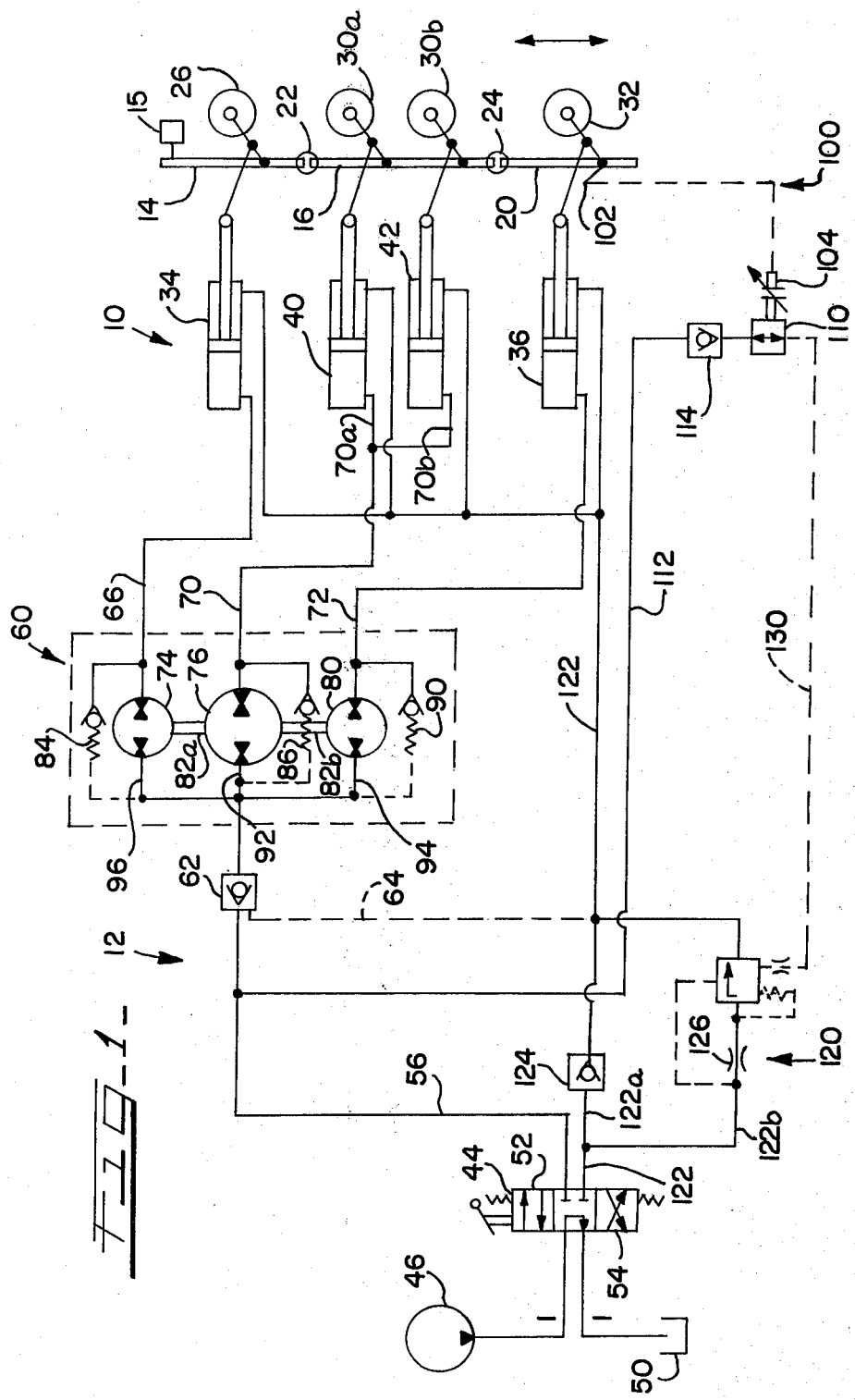

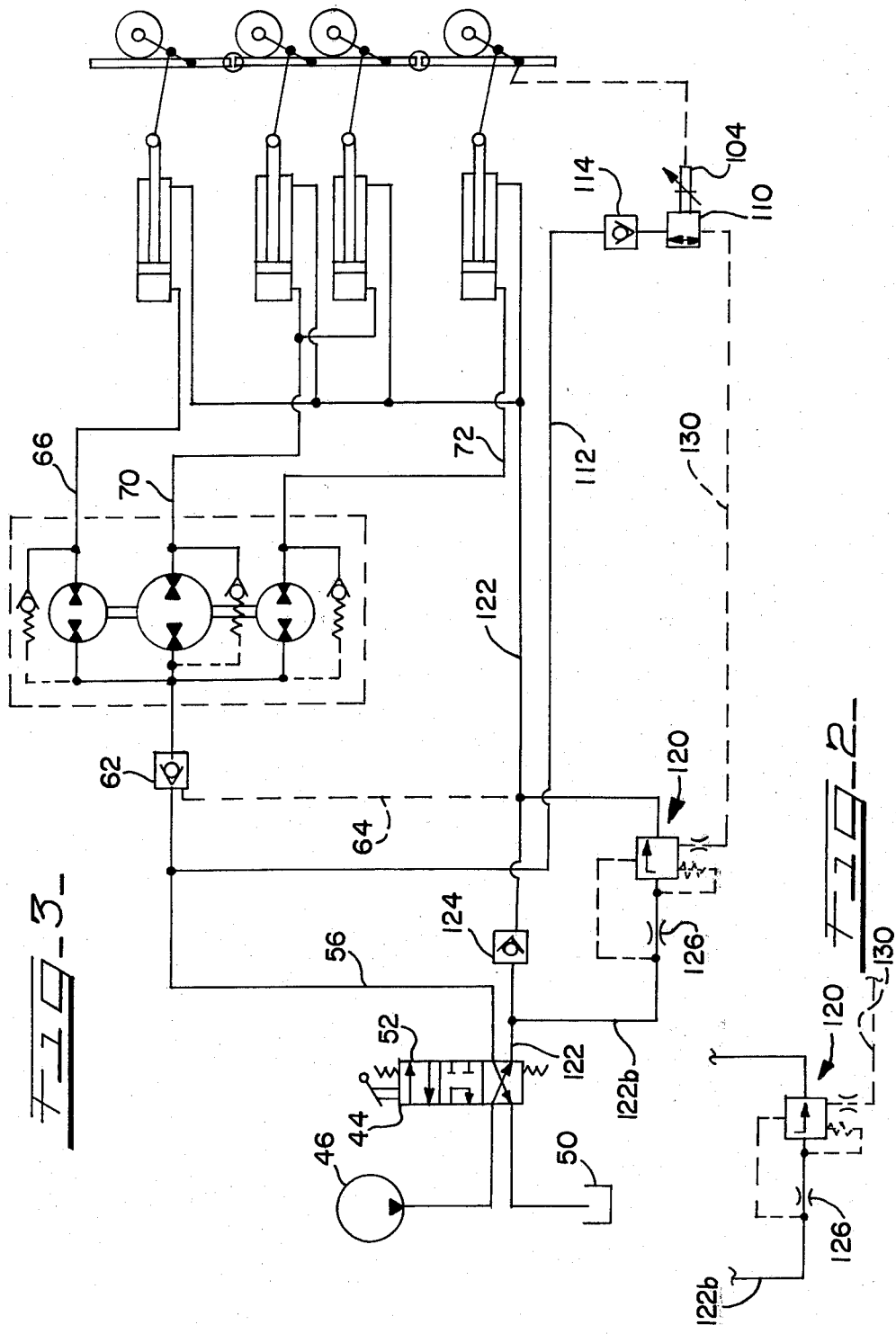

AGRICULTURAL IMPLEMENT SECTIONAL FRAME WITH DEPTH LIMIT

CROSS-REFERENCES TO RELATED APPLICATIONS

This invention is related to and an improvement over U.S. patent application of William C. Swanson titled "Hydraulic Circuit for Synchronous Lift of Flexible Frame Implements," Ser. No. 156,897, filed June 5, 1980, having an assignee in common with this application.

BACKGROUND OF THE INVENTION

1. Field of the Invention

A flexible tool bar or agricultural implement sectional frame for use in supporting agricultural implements is provided. More definitively a flexible tool bar for supporting the disks of a disk harrow for instance, including a plurality of ground support wheels for supporting host segments of the flexible tool bar is the subject of this invention. Several ground support wheel positioning cylinders are synchronously supplied with pressurizing fluid from a pump, driving fluid through a rotary flow divider. Adjustability of the depth of the implement is limited and controlled by a hydraulic and mechanical feedback linkage.

2. Description of the Prior Art

Contemporary flexible toolbar embodiments are provided with several support wheels and attendant positioning cylinders. In the most basic embodiment the positioning cylinders are supplied with hydraulic fluid for movement through the use of a hydraulic pump associated with a hand operated valve for controlling fluid to the support cylinders. In this situation each segment of the tool bar will be raised or lowered in a nonsynchronous action with the lightest components raising first followed by the heavier elements.

An improvement over this basic system is a system utilizing a master and slave hydraulic cylinder control system. For multi-element cultivators and disk harrows a master cylinder would be pivotally connected to a central frame element and the other end would be connected to a rock shaft linkage for operating the wheels of the central frame section. The piston or head end of the master cylinder is hydraulically connected to a pump source of fluid and the rod end of the master cylinder was independently hydraulically connected in series to the head end of each slave cylinder. Each slave cylinder is physically connected to a supporting wheel mounted on each independent frame section. In a well designed master-slave system the slave operated frame elements would, theoretically, lift uniformly with the master controlled central frame. However, the limitation on the implement designer through the necessity of using non-standard cylinder sizes to insure synchronous movement of each frame section is a cost/expense limitation making the master-slave system less than optimum for implement design.

Not known in the prior art to the inventor is the mechanical feedback linkage for controlling implement depth in an implement hydraulic circuit utilizing a rotary flow divider. Without the feature set forth in this invention the raising of an implement frame to clear an obstacle or make a turn at a headland will require subsequent manipulation by the operator to return the implement to a prior optimum working depth.

SUMMARY OF THE INVENTION

The invention is a hydraulically operated support system for use on an agricultural implement that has multi-sectioned, hinged frame members. The frame members are wheel supported and associated with a hydraulic cylinder to raise or lower the frame on the wheels relative to the ground. All the hydraulic cylinders are connected in parallel to a multi-rotor rotary flow divider having rotors sized to match the volume requirements of the wheel supporting cylinder it is ported to.

A mechanical adjustment position control provides a control to position the implement relative to the ground plane allowing the implement to be lifted and returned to a preset elevation without readjustment by the operator.

It is, therefore, the object of this invention to provide a hydraulic circuit for synchronous displacement of segments of a multi-section farm implement with capability to return to a preset elevation with respect to the ground plane after the implement has been raised above the preset position.

BRIEF DESCRIPTION OF THE DRAWING FIGURES

The object of this invention, as well as other objects set forth below, will become apparent through an understanding of the invention as taught by this specification and as shown by the drawing figures wherein:

FIG. 1 presents a hydraulic schematic of a flexible tool bar having a plurality of ground support wheels;

FIG. 2 is a portion of the hydraulic system as excerpted from FIG. 3; and

FIG. 3 presents the schematic of FIG. 1 wherein an implement is lowered to a predetermined set point.

DETAILED DESCRIPTION OF THE DRAWING FIGURES

The hydraulic control system of this invention applies to agricultural implements having mutli-sectioned hinged implement frame members. The implement section is pictorially represented generally by 10 while the hydraulic control system is represented generally by 12.

The multi-sectioned hinged implement frame is shown by segments 14, 16 and 20, right wing, center section and left wing respectively, which as typified by right wing segment or member 14 are frame members to which an implement such as a disk harrow as schematically indicated at 15 could be attached.

Segment 14 is hinged at first hinge 22 to segment 16 while 16 is hinged at second hinge 24 to segment 20. The right wing 14 is supported by right wing wheel and linkage 26, the center section 16 by dual wheels and linkage 30a and 30b and the left wing 20 by left wing wheel and linkage 32.

Each wheel and linkage is associated with a supporting cylinder to adjust the load carrying ground wheels. The right wing cylinder 34 and the left wing cylinder 36 associated with respective right and left wheel linkages are single cylinders while the center section 16 elevation is adjusted through the use of a pair of cylinders, namely first and second center section cylinders 40 and 42.

When the implement is being transported the head side of the cylinders will be pressurized extending the piston rods to hold the wheels in contact with the ground and hold the implement frame section above the ground plane. Notice that the wheel linkages shown are only representative of the actual linkage used and many linkage geometries and configurations are possible. To lower the implement the wheels are raised by supplying fluid to the rod side of the cylinders and exhausting the head side of the cylinders.

The hydraulic system for raising and lowering the agricultural implement is shown generally as item 12.

A manual control valve 44, typically a three section neutral centered valve, separates a fixed displacement pump 46 and a reservoir 50 from the distribution section of the system. The fixed displacement pump and the open center manual control valve could of course be replaced with a variable displacement pump and a closed center valve if design requirements merited such a preference. The manual control valve 44 is movable from neutral as shown to a first position wherein the implement will be raised as the wheels are lowered as represented by first section 52. Alternatively the valve can be moved to a second position, represented by third valve section 54, wherein the wheels are raised to lower the implement.

First fluid delivery line 56 provides fluid passage from the manual control valve 44 to a rotary flow divider generally 60. Interposed in line 56 is a pilot operated check valve 62 allowing flow to the rotary flow divider at all times and allowing flow from the rotary flow divider only when unseated through actuating pressure in the first signal line 64.

The trifurcated output from the rotary flow divider generally 60 is communicated by first, second and third cylinder supply lines 66, 70 and 72 respectively, which are connected to the head side chambers of the cylinders 34, 40, 42 and 36. The second cylinder supply line 70 is bifurcated into lines 70a and 70b to supply each of the center section cylinders.

The rotary flow divider, generally 60, is provided with three rotors 74, 76 and 80, which may be of a gear or vane type, such as shown in U.S. Pat. No. 2,949,924. Each rotor is interconnected by a shaft 82a and 82b. The first and third rotors 74 and 80 are generally the same size, that is of the same volumetric capacity while the second rotor 76 is larger, i.e. greater volumetric capacity, to enable the displacement of each rotor to match the volume requirement of the supporting cylinders or cylinder to which it is supported. The rotors are each capable of functioning as a bi-directional pump when shaft 82 is rotated and capable of functioning as a bi-directional motor when flow of hydraulic fluid is directed therethrough.

The rotary flow divider, generally 60, will assure an equal distribution of fluid into the head ends of the cylinders when fluid is supplied through first fluid delivery line 56 from the pump 46. Also when fluid flows out of the piston ends of the cylinders the rotary flow divider will equalize the rate of flow from each cylinder. When a cylinder gets to the end of its stroke before the others the rephasing valves either 84, 86 or 90 associated with the other cylinders will open, allowing rephasing of all the cylinders.

When the implement wheels are being raised or lowered and one of the cylinder rods encounters a greater resistance than the others, the flow of fluid to the more lightly loaded rods will drive the associated rotors and thereby will increase the pressure of the flow to the more heavily loaded ram. For example, if the right wing cylinder 34 encounters a heavier load, say when pulling the implement out of the ground, the fluid from the pump 46 through line 56 will follow the path of least resistance, i.e., through passages 92 and 94 to the cylinders 40, 42 and 36. The flow of fluid through passages 92 and 94 will cause the rotors 76 and 80 to be driven as hydraulic motors which will drive rotor 74 as a pump through shaft 82a. The rotor 74 acting as a pump will draw fluid from passage 96 and discharge the fluid into passage 66 at a higher pressure sufficient to move the rod of cylinder 34 and its heavier load. The flow rates to the four cylinders will remain substantially the same so that the implement frame will be raised evenly.

The adjustable feedback feature for mechanical adjustment position control provides a control to position the distance the implement frame stops relative to the ground plane. This is a convenience as it is oftentimes necessary to raise the working implement to clear some obstruction such as an untilled water runoff grass waterway. After raising the implement it is desirable that it be again lowered to the same working depth as it was before the obstruction without a lot of estimated positioning and adjustments by the operator. The mechanical adjustment position control provides the desired automatic apparatus.

An adjustable feedback linkage, generally 100, is connected between at least one of the ground wheels linkage such as 32 at, for instance, link 102. The feedback linkage is adjustable as represented by adjustable linkage 104 which may be a hand crank and screw and may include a lost motion device to prevent damage to the linkage. Adjustable linkages are well known in the art and any of several embodiments would work equally well.

The linkage could be connected to the center section rather than to the wing section as shown.

The adjustable linkage 104 is mounted to operate a pilot valve 110 that is normally open but can be closed by the adjustable feedback linkage, generally 100, as explained below. The pilot valve 110 is connected through conduit 112 to the first fluid delivery line 56. First check valve 114 is interposed in conduit 112 to prevent flow from the first fluid delivery line 56 to the pilot valve 110 but will enable fluid passage in the other direction.

Signal line 130 connects the pilot valve 110 to a main lowering supply flow control valve, generally 120. This implement lowering (wheel raise) control valve is spring biased to a closed position as shown but will open when the manual control valve 44 is placed so that the pump is connected to the second fluid delivery line 122 which incorporates branches 122a and 122b. Branch 122b accommodates the implement lowering flow control valve 120 and branch 122a accommodates a second check valve 124 which allows fluid to flow to reservoir 50 when the manual control valve is aligned so that first valve section 52 is operative.

The second fluid delivery line 122 continues from the manual control valve to the rod side fluid supply port of each of the cylinders 34, 36, 40 and 42.

FIGS. 2 and 3 represent the control system in two phases or stages of its operation.

In operation the feedback control will come into operation only when lowering the implement to the ground—that is upon raising the wheels. The manual control valve 44 in FIGS. 2 and 3 will be moved to the positions shown. The pump 46 will supply fluid to the second fluid delivery line 122 and it will be forced to flow through the second branch 122b due to the obstruction of branch 122a by the second check valve 124.

The main lowering supply flow control valve, generally 120, will be forced open due to the pressure drop created by its orifice 126 allowing fluid to flow through the second fluid delivery line 122 to the rod side of the cylinders 34, 36, 40 and 42. This flow will continue until either the operator moves the manual control valve 44 to neutral or the implement raised position (section 52) or until the adjustable feedback linkage, generally 100, closes the pilot valve 110 as in FIG. 3.

In FIG. 3 the implement has been lowered to the preset position determined by the operator. The operator had earlier adjusted the adjustable linkage 104 so that the implement would be lowered to the desired depth. The pilot valve 110 has closed preventing flow from signal line 130 to conduit 112. With this flow blocked the pressure seen by each side of the flow control valve 120 will equalize and the spring will seat the valve in the closed position as represented in FIG. 3 terminating flow to the second fluid delivery line 122 and the rod side of each cylinder. The pump 46 will then go over relief or destroke if it is a variable displacement pump even if the operator continues to hold the manual control lever 44 in the implement lowering position as shown. In operation the manual control valve will actually be returned to the neutral position through the operation of a contemporary well known automatic unlatching system. Thus the manual valve position shown in FIG. 3 will only be so displaced when the operator is lowering the implement until the main lowering supply flow control valve 120 is closed by the adjustable feedback linkage generally 100 and the pilot valve 110.

While the rod side of the cylinders are being pressurized the piston side fluid is being forced out. This fluid will flow through the cylinder supply lines 66, 70 and 72, the rotary flow divider—here working in "reverse" to insure that the center and wing sections are lowered simultaneously—through the pilot operated check valve 62—but only when the ball is unseated by pressure in first signal line 64 which will only happen when, as in FIG. 2, the flow control valve 120 is open, through the manual control valve 44 to reservoir 50. First check valve 114 prevents passage through conduit 112 from first fluid delivery line 56.

The first check valve 114 could be optionally eliminated if the pilot valve 110 was designed for one way flow. The first check valve 114 does however prevent the implement raise pressure from dislodging the low pressure seal in the pilot valve 110.

Raising the implement frame 14, 16 and 20 will not be affected by the main lowering supply flow control valve 120. To raise, that is to lower the wheels 26, 30a, 30b and 32, the manual control valve 44 is displaced to align the first valve section 52 with the pump supply. This causes flow through the first fluid delivery line 56, the pilot operated check valve 62, the rotary flow divider, generally 60, and first, second and third cylinder supply lines to the piston side of the cylinders urging them to raise the implement by lowering the wheels. Fluid will be exhausted from the rod side through second fluid delivery line 122 to the reservoir 50 unobstructed by second check valve 124. Fluid will not pass through the flow control valve 120 as this valve will be seated but will pass unimpeded through the second check valve 124.

To clarify the type of flow control valve, generally 124, that is used in this embodiment the following description is provided. One type of flow control valve would have a housing with three fluid access ports. A cylindrical bore in the housing would contain a valve member movable to open or close an outlet port. The valve member would be spring biased to a closed position. The valve member would include an orifice 126 allowing fluid communication to either side thereof. The inlet port would allow fluid supply to the interior bore of the housing. The third port would be a signal line port connected to the spring chamber on the backside of the valve member and would receive a signal from signal line 130 (that is when 130 is "fluid bound").

The pilot valve 110 could be a housing having a bore containing a valve member mechanically connected to the operating linkage to close off a supply port and delivery port circuit. The assignee of this invention produces a pilot valve, identified as a "foot-n-inch" valve that could be used as this pilot valve. In any case, the pilot valve is known in the art.

Thus it can be seen that there has been provided a feedback control system for use on an agricultural implement that automatically returns an implement to a preset working depth after the implement has been raised on implement support wheels and that also uses a rotary flow divider to proportion fluid flow to the various lifting cylinders of the implement frame. Although a specific embodiment of this invention has been set forth, various modifications to the invention are possible that fall within the spirit and scope of the appended claims. Thus, for instance, an agricultural implement frame having more or less than three sections as shown or having more or less than the four cylinders as shown, thus necessitating a rotary flow divider having more than three rotors would be contemplated by the inventor.

What is claimed is:

1. In an agricultural implement having frame sections including a main frame section and at least one flexibly attached wing frame section thereon, and a wheel assembly associated with each said frame section supporting each said frame section, a hydraulic circuit for controlling said wheel assemblies comprising:
   a plurality of hydraulic cylinders, having head and rod ends, each of said plurality pivotally connected to one each of said frame sections and to one each of said wheel assemblies associated with each said frame section;
   a multi-rotor rotary flow divider having one of each of said rotors for metering flow to one of each of said hydraulic cylinders;
   a mechanical linkage affixed to one of said hydraulic cylinders and displaced upon displacement of said one hydraulic cylinder;
   a pilot valve associated with said mechanical linkage to close upon engagement with said linkage;
   a main lowering supply flow control valve hydraulically connected to said pilot valve and hydraulically connected to said hydraulic circuit, said flow control valve terminating flow to said hydraulic cylinders when said pilot valve is closed.

2. The invention in accordance with claim 1 wherein said hydraulic circuit further comprises:
   a manual control valve;
   a first fluid delivery line for supplying fluid to the head end of each of said hydraulic cylinders when said manual control valve is displaced to a first position;

a second fluid delivery line for supplying fluid to the rod end of said hydraulic cylinders when said manual control valve is displaced to a third position;

a first check valve in said first fluid delivery line preventing flow from said first fluid delivery line to said pilot valve;

a second check valve in said second fluid delivery line allowing flow from said rod ends of said cylinders when said manual control valve is displaced to said first position.

3. The invention in accordance with claim 1 or claim 2 wherein said rotors of the multi-rotor rotary flow divider comprise:

a first rotor having volumetric capacity to meter hydraulic fluid to a single one of said hydraulic cylinders;

a second rotor mechanically connected to said first rotor by a shaft, having volumetric capacity to meter hydraulic fluid to more than one of said hydraulic cylinders;

a third rotor, mechanically connected to said second and said first rotors by said shaft, having volumetric capacity to meter hydraulic fluid to a single one of said hydraulic cylinders.

4. The invention in accordance with claim 1 wherein said rotary flow divider is provided with a plurality of rephasing valves, one each of said plurality of rephasing valves associated with one each of said rotors.

5. In an agricultural implement having a plurality of earth engaging working tools carried by a multi-section frame, each of said frame sections supported on at least a single wheel and linkage means connecting said wheels to said frame sections, a hydraulic cylinder connected to each said wheel and linkage means for raising and lowering said wheel connected thereto, and a hydraulic circuit for supplying fluid under pressure to said hydraulic cylinders, said hydraulic circuit comprising:

a source of fluid;

a neutral centered manual control valve having first and third displaced sections relative to the neutral centered section;

a first fluid delivery line for supplying fluid to the head end of each of said hydraulic cylinders when said manual control valve is displaced to said first valve section;

a rotary flow divider in said first fluid delivery line for trifurcating the supply of fluid to said cylinders;

a second fluid delivto the rod end of said hydraulic cylinders when said manual control valve is displaced to said third valve section;

an adjustable feedback linkage connected to one of said wheel and linkage means;

a pilot valve connected for mechanical operation to said adjustable feedback linkage displaceable to a closed position by said linkage;

a main lowering supply flow control valve interposed in said second fluid delivery line and hydraulically connected to said pilot valve for operation thereby to a closed position when said pilot valve is closed;

a check valve (124) in said second fluid delivery line allowing flow from said rod ends of said cylinders when said manual control valve is displaced to said first valve section; and a pilot operated check valve in said first fluid delivery line allowing flow to said head ends of said cylinders when said manual control valve is displaced to said first valve section and also when said manual control valve is displaced to said third valve section and said main lowering supply flow control valve is open.

6. The invention in accordance with claim 5, wherein said pilot valve is connected by a conduit to said first fluid delivery line and includes a first check valve therein preventing flow from said first fluid delivery line to said pilot valve.

7. The invention in accordance with claim 5 or claim 6, wherein said rotary flow divider comprises a number of rotors including:

a first rotor having volumetric capacity to meter hydraulic fluid to a single one of said cylinders;

a second rotor mechanically connected to said first rotor by a shaft, having volumetric capacity to meter hydraulic fluid to more than one of said cylinders;

a third rotor, mechanically connected to said second and first rotors by said shaft, having volumetric capacity to meter hydraulic fluid to a single one of said cylinders.

8. The invention in accordance with claim 7, wherein said rotary flow divider is provided with a plurality of rephasing valves, one each of said plurality of rephasing valves associated with one each of said first, second and third rotors.

* * * * *